(12) United States Patent
Tiwari et al.

(10) Patent No.: US 10,935,265 B2
(45) Date of Patent: Mar. 2, 2021

(54) BIOMETRIC AIR CONDITIONING CONTROL SYSTEM

(71) Applicant: Carrier Corporation, Palm Beach Gardens, FL (US)

(72) Inventors: Ankit Tiwari, South Windsor, CT (US); Blanca Florentino Liano, Cork (IE); Piyush Agrawal, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/422,010

(22) Filed: May 24, 2019

(65) Prior Publication Data

US 2019/0360708 A1 Nov. 28, 2019

Related U.S. Application Data

(60) Provisional application No. 62/675,997, filed on May 24, 2018.

(51) Int. Cl.
*F24F 11/30* (2018.01)
*F24F 11/58* (2018.01)
(Continued)

(52) U.S. Cl.
CPC .............. *F24F 11/30* (2018.01); *F24F 11/58* (2018.01); *F24F 11/64* (2018.01); *F24F 11/65* (2018.01);
(Continued)

(58) Field of Classification Search
CPC .. F24F 11/30; F24F 11/58; F24F 11/64; F24F 11/65; F24F 11/80; F24F 2110/10;
(Continued)

(56) References Cited

U.S. PATENT DOCUMENTS 7,605,714 B2 10/2009 Thompson et al.
9,473,321 B1 10/2016 Bazar et al.
(Continued)

FOREIGN PATENT DOCUMENTS

CN 104824865 A 8/2015

*Primary Examiner* — Charles R Kasenge
(74) *Attorney, Agent, or Firm* — Cantor Colburn LLP (57) ABSTRACT

A biometric air conditioning control system includes a local electronic device, an ambient air parameter sensor, a mobile device, a storage medium, and a processor. The electronic device is located in an area and includes a transceiver and a near field communication device configured to broadcast a beacon signal via the transceiver. The parameter sensor is configured to measure and output measured air parameter information. The mobile device includes a human interface device, a transceiver configured to receive the beacon signal, a biometrics sensor configured to output a measured biometric information of the occupant relative to occupant comfort. The storage medium stores thermal profile matrix data, authentication data associated with the beacon signal, and a software-based application. The processor executes the application using the profile matrix data, the authentication data, occupant comfort level information inputted by the occupant via the HID, the biometric information, and the air parameter information.

18 Claims, 4 Drawing Sheets

(51) Int. Cl.
*F24F 11/64* (2018.01)
*F24F 11/80* (2018.01)
*G05B 19/042* (2006.01)
*F24F 11/65* (2018.01)
*F24F 110/10* (2018.01)
*F24F 110/20* (2018.01)
*F24F 120/12* (2018.01)
*F24F 120/14* (2018.01)

(52) U.S. Cl.
CPC ............ *F24F 11/80* (2018.01); *G05B 19/042* (2013.01); *F24F 2110/10* (2018.01); *F24F 2110/20* (2018.01); *F24F 2120/12* (2018.01); *F24F 2120/14* (2018.01); *F24F 2221/38* (2013.01); *G05B 2219/2614* (2013.01)

(58) Field of Classification Search
CPC ............ F24F 2110/20; F24F 2120/12; F24F 2120/14; F24F 2221/38; F24F 2120/20; F24F 11/89; F24F 2110/50; G05B 19/042; G05B 2219/2614; A61B 5/02055
See application file for complete search history.

(56) References Cited

U.S. PATENT DOCUMENTS

| | | | |
|---|---|---|---|
| 9,546,796 B2 | 1/2017 | Difulgentiz, III | |
| 9,839,101 B2 | 12/2017 | Clymer et al. | |
| 9,989,944 B2 * | 6/2018 | Henneberger | ......... G05B 15/02 |
| 10,288,308 B2 * | 5/2019 | Svendsen | ................. F24F 11/30 |
| 10,345,768 B2 * | 7/2019 | Fullam | ................... G05B 15/02 |
| 10,372,093 B2 * | 8/2019 | Davalos | ................. G05B 15/02 |
| 10,638,292 B2 * | 4/2020 | Karp | ....................... G06F 9/541 |
| 2010/0045470 A1 * | 2/2010 | Araiza | ................ F24D 19/1003 |
| | | | 340/603 |
| 2012/0253521 A1 * | 10/2012 | Storm | ..................... G05B 15/02 |
| | | | 700/276 |
| 2013/0048263 A1 | 2/2013 | Nouvel et al. | |
| 2014/0085101 A1 | 3/2014 | Rahman et al. | |
| 2014/0107292 A1 | 7/2014 | Ramagem et al. | |
| 2015/0168003 A1 * | 6/2015 | Stefanski | ................. F24F 11/70 |
| | | | 165/237 |
| 2015/0276269 A1 * | 10/2015 | Paolini | ..................... F24H 11/30 |
| | | | 392/365 |
| 2015/0338117 A1 * | 11/2015 | Henneberger | ......... G05B 15/02 |
| | | | 700/276 |
| 2015/0345816 A1 * | 12/2015 | Donovan | ................. F24F 11/30 |
| | | | 165/209 |
| 2016/0091877 A1 * | 3/2016 | Fullam | ..................... G09G 3/00 |
| | | | 700/276 |
| 2016/0097557 A1 * | 4/2016 | Steinberg | ............... G05B 15/02 |
| | | | 700/278 |
| 2016/0131383 A1 | 5/2016 | Zhao et al. | |
| 2016/0252267 A1 * | 9/2016 | Davalos | ................. G05B 15/02 |
| | | | 700/276 |
| 2016/0261425 A1 * | 9/2016 | Horton | ................ H04L 12/2818 |
| 2016/0278444 A1 | 9/2016 | Jordan et al. | |
| 2016/0363946 A1 | 12/2016 | Nelson, Jr. et al. | |
| 2017/0031334 A1 | 2/2017 | Medelius | |
| 2017/0191688 A1 * | 7/2017 | Svendsen | ............... G05D 23/00 |
| 2017/0321921 A1 | 11/2017 | Chen et al. | |
| 2017/0370604 A1 | 12/2017 | Carey et al. | |
| 2018/0144615 A1 * | 5/2018 | Kinney | ............ G08B 13/19695 |
| 2018/0267701 A1 * | 9/2018 | Rigg | ...................... G06F 3/0488 |

* cited by examiner

BIOMETRIC AIR CONDITIONING CONTROL SYSTEM

CROSS-REFERENCES TO RELATED APPLICATIONS

This patent application claims priority to U.S. Provisional Patent Application Ser. No. 62/675,997, filed May 24, 2018, which is incorporated herein by reference in its entirety.

BACKGROUND

The present disclosure relates to air conditioning systems, and more particularly, to a biometric air conditioning control system.

An occupant's biometric parameters such as thermal comfort, skin temperature, and metabolism may be applied to assist in the control of one or more air conditioning systems used to adjust ambient temperature and humidity in a prescribed area, or room, that may be occupied by the occupant. Unfortunately, known systems and methods may require the occupant to frequently report their comfort level, and also share sensitive biometric information directly with building control system. Moreover, existing methods may not be capable of reasonably handling multiple occupants residing in a single area and with their differing comfort levels, or multiple occupants where one or more are short duration occupants.

Further enhancements to biometrically controlled air conditioning systems are desirable.

BRIEF DESCRIPTION

A biometric air conditioning control system is adapted to control an air conditioning unit. The biometric air conditioning control system according to one, non-limiting, embodiment of the present disclosure c: a local electronic device located in a predefined area, and including a transceiver and a short range communication device configured to broadcast a beacon signal via the transceiver; an ambient air parameter sensor configured to measure and output at least one measured air parameter information; a mobile device adapted to be carried by an occupant, the mobile device including a human interface device (HID), a transceiver configured to receive the beacon signal, a biometrics sensor configured to measure and output at least one measured biometric information of the occupant relative to occupant comfort; one or more electronic storage mediums configured to store profile matrix data, authentication data associated with the beacon signal, and a software-based application; and one or more processors configured to execute the software-based application that compares the authentication data to the beacon signal, and compares the profile matrix data, to the occupant comfort level information inputted by the occupant via the HID, the at least one measured biometric information, and the at least one measured air parameter information.

Additionally to the foregoing embodiment, the local electronic device is a thermostat that includes the ambient air parameter sensor, and the at least one measured air parameter information is wirelessly sent to the mobile device via the transceiver of the local electronic device.

In the alternative or additionally thereto, in the foregoing embodiment, the ambient air parameter sensor includes a temperature sensor.

In the alternative or additionally thereto, in the foregoing embodiment, the ambient air parameter sensor includes a humidity sensor.

In the alternative or additionally thereto, in the foregoing embodiment, the profile matrix data includes learned data associating parameter data to biometrics data.

In the alternative or additionally thereto, in the foregoing embodiment, the profile matrix data includes occupant comfort level data associated with the biometrics data.

In the alternative or additionally thereto, in the foregoing embodiment, the mobile device includes the one or more electronic storage mediums and the one or more processors.

In the alternative or additionally thereto, in the foregoing embodiment, the software-based application is configured to develop and store occupant visiting history data.

In the alternative or additionally thereto, in the foregoing embodiment, the mobile device includes an inertial measurement unit (IMU) sensing system, and the one or more storage mediums are configured to store gesture-based data indicative of an intentional gesture performed by the occupant signifying an intent for the application to process the profile matrix data specific to the occupant.

In the alternative or additionally thereto, in the foregoing embodiment, the profile matrix data is one of a plurality of profile matrix data with each profile matrix data being specific to one of a plurality of mobile devices with each one of the plurality of mobile devices being adapted to be worn by a respective one of a plurality of occupants, and wherein the mobile device sets the thermostat only when measured biometric data indicates that a current comfort level of the occupant is outside of a desired comfort level specified in the profile matrix data for the occupant.

In the alternative or additionally thereto, in the foregoing embodiment, the IMU sensing system is configured to measure occupant motion indicative of the intentional gesture and whether or not the occupant is stationary within the predefined area.

A biometric air conditioning control system according to another, non-limiting, embodiment, is adapted to control an air conditioning unit for separately adjusting air temperature in a plurality of predefined areas. The biometric air conditioning control system comprises: a plurality of thermostats with each thermostat of the plurality of thermostats located in a respective one of the plurality of predefined areas, each thermostat including a controller, a transceiver, and an ambient air temperature sensor configured to measure and output ambient air temperature information; and a mobile device adapted to be carried by an occupant, the mobile device including an electronic storage medium, a processor, a human interface device (HID), a transceiver configured to receive the beacon signal and the ambient air temperature information, an occupant temperature sensor configured to measure and output a skin temperature of the occupant associated with occupant comfort, wherein the electronic storage medium is configured to store thermal profile matrix data associated with occupant comfort, and a software-based application, and the processor is configured to execute the software-based application configured to compare the profile matrix data, to the occupant comfort level information inputted by the occupant via the HID, the occupant temperature information, and the ambient air temperature information, then effect the output of a command signal based on the comparison to the controller of the respective thermostat of the plurality of thermostats to optimize occupant comfort.

Additionally to the foregoing embodiment, each thermostat of the plurality of thermostats include a near field communication device configured to broadcast a beacon signal via the transceiver of the respective thermostat, the electronic storage medium is configured to store authentication data associated with the beacon signal, and the software-based application is configured to compare the authentication data to the beacon signal to authenticate the respective occupant.

In the alternative or additionally thereto, in the foregoing embodiment, the mobile device includes an inertial measurement unit (IMU) sensing system configured to measure and output mobile device motion data, and the software-based application is configured to process the mobile device motion data to determine if the respective occupant a transitory occupant or a primary occupant of the plurality of occupants.

In the alternative or additionally thereto, in the foregoing embodiment, the software-based application is configured not to effect the output of the command signal if the occupant is a transitory occupant, and effect the output of the command signal if the occupant is a primary occupant.

In the alternative or additionally thereto, in the foregoing embodiment, the mobile device is a wearable mobile device.

In the alternative or additionally thereto, in the foregoing embodiment, the mobile device is one of a smart watch, a smart shoe, and smart glasses.

A method of operating a biometric air conditioning control system according to another, non-limiting, embodiment comprises: detecting a thermostat by a mobile device carried by an occupant; determining if the occupant is stationary by the mobile device; determining if the occupant is a primary occupant by the mobile device if the occupant is determined to be stationary; detecting an intentional gesture performed by the occupant if the occupant is determined not to be a primary occupant; and sending a command signal to the thermostat indicative of a preferred ambient temperature if the intentional gesture is received and recognized by the mobile device.

Additionally to the foregoing embodiment, the method includes learning a profile matrix data specific to the occupant by a software-based application executed by a processor of the mobile device.

In the alternative or additionally thereto, in the foregoing embodiment, the learning includes: measuring a skin temperature and heartrate of the occupant by respective temperature and metabolism sensors of the mobile device; determining if the skin temperature and heartrate reflect a change; determining if a profile matrix data is preprogrammed into the mobile device if the skin temperature or the heartrate has changed; and polling the occupant for a comfort rating if the profile matrix data is not preprogrammed.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
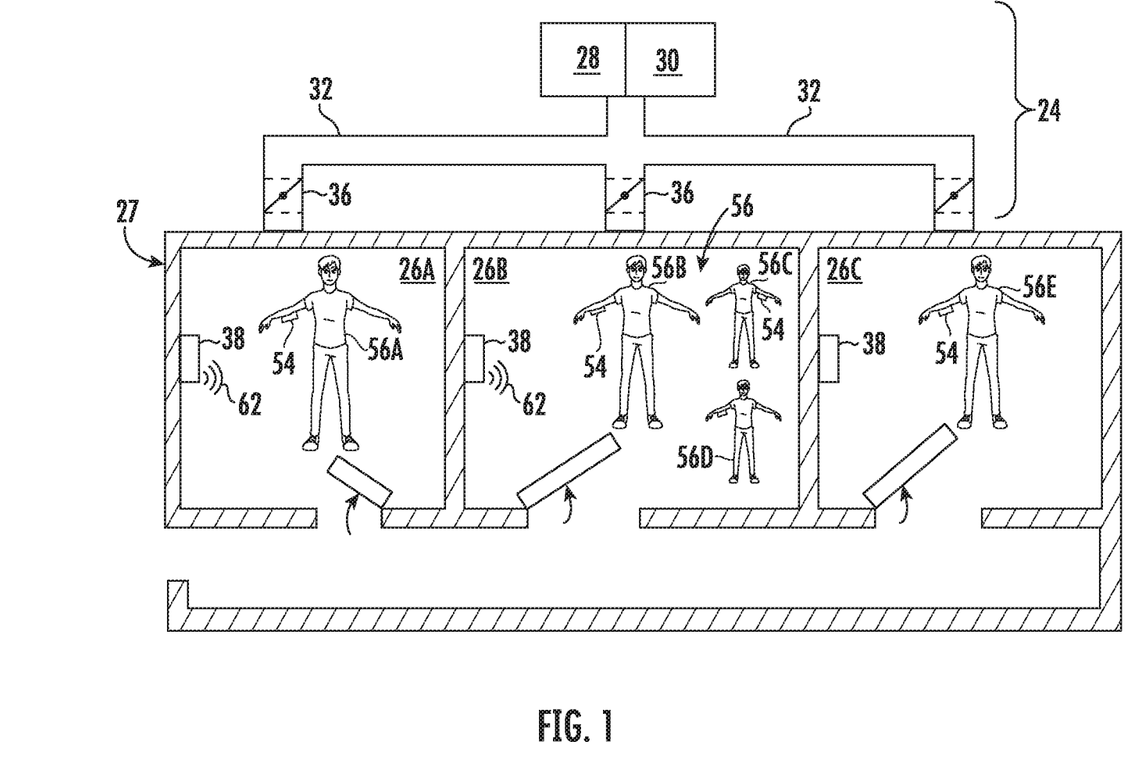
FIG. 1 is a schematic of one, non-limiting, application using a biometric air conditioning control system as one exemplary embodiment of the present disclosure.

Referring to FIG. 1, a biometric air conditioning control system 20 is applied to an air conditioning unit 24 adapted to condition ambient air in a plurality of areas or rooms (i.e., three illustrated as 26A, 26B, 26C) of, for example, a building 27. In one embodiment, the air conditioning unit 24 may include an air temperature unit 28, an air humidity unit 30, ductwork 32 (with branches) to flow conditioned air (see arrow 34 from at least one of the units 28, 30, a plurality of dampers 36 in each respective branch of the ductwork 32 to flow the air 34 into the respective areas 26A, 26B, 26C and a plurality of local electronic devices 38 (e.g., thermostats) in each respective area of the plurality of areas 26A, 26B, 26C. Although generally illustrated as a forced air system, the air conditioning unit 24 may be a hydronic system, or any other type of system capable of conditioning ambient air (i.e., controlling an air parameter) in the predefined areas 26A, 26B, 26C.

Figure 2:
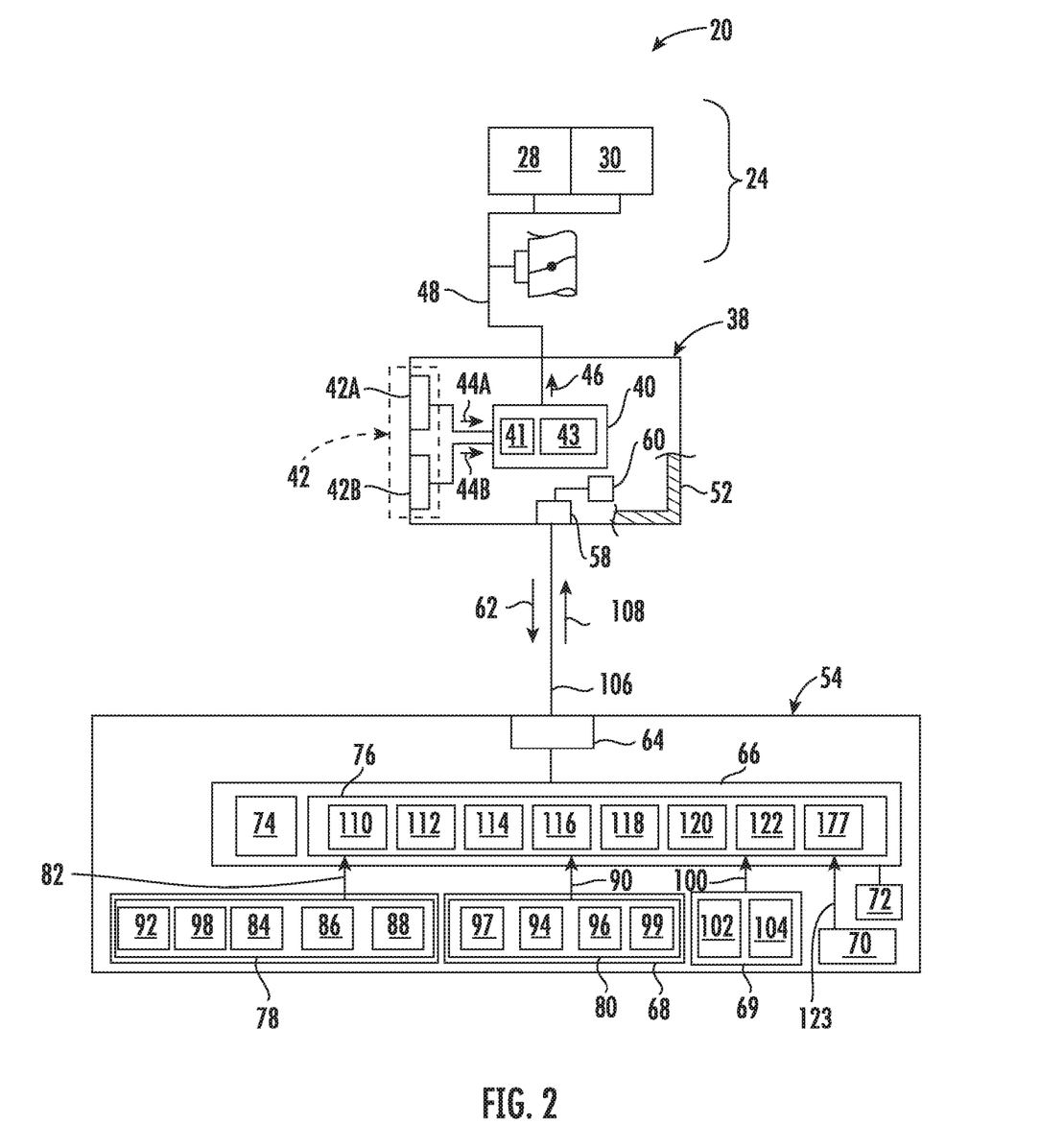
FIG. 2 is a schematic of the biometric air conditioning control system.

Referring to FIGS. 1 and 2, each electronic device 38 may include a controller 40, and at least one parameter sensor 42 configured to measure and output air parameter information (see arrows 44A, 44B in FIG. 2) to the controller 40. The controller 40 may be configured to process the air parameter information 44A, 44B and output a command signal (see arrow 46) to one or more of the units 28, 30 and dampers 36 over a wired, or wireless, interface 48. In one embodiment, air parameter information 44A may be air temperature information and the parameter sensor 42 may include a temperature sensor 42A. In addition too, or alternatively, the air parameter information 44B may be humidity information and the parameter sensor 42 may include a humidity sensor 42B. Other air parameters that may be controlled include oxygen levels, carbon dioxide levels, and/or other gas levels within a predefined area.

The electronic device 38 and related components (i.e., controller 40 and sensor 42) may be arranged in a common housing 52 and mounted to, for example, a wall or ceiling of the respective area. The controller 40 may include a processor 41 and an electronic storage medium 43, The processor 41 may be any combination of one or more of a central processing unit (CPU), multiprocessor, microcontroller unit (MCU), digital signal process (DSP), application specific integrated circuit, and others capable of executing software instructions, or otherwise controllable to behave according to predetermined logic. The storage medium 43 may be any combination of read and write memory (RAM) and read only memory (ROM). The storage medium 43 may also include persistent storage, which can be any single one or combination of solid-state memory, magnetic memory, or optical memory storing a computer program (i.e., application) with software instructions.

In one example, the dampers 36 may be adjustably actuated via a driver or electric motor with a relay operated by the controller 40. In addition, or in another embodiment, the controller 40 may directly control the units 28, 30 by any means generally known to one having skill in the art. In another embodiment, one or more of the units 28, 30 may be controlled by the controller 38, and the units 28, 30, in-turn, control the dampers 36.

The communication interface 48 may be any hardwired (e.g., bussed, RS-485, Ethernet), or any current or future wireless interface allowing communication between the electronic device 38, the dampers 36, and the units 28, 30. Non-limiting examples of a wireless interface 48 include ZigBee, Bluetooth, Bluetooth Low Energy (BLE), Radio Frequency Identification (RFID), Near Field Communication (NFC), any of the IEEE 802.11 standards, and others.

The biometric air conditioning control system 20 may include at least one mobile device 54 (i.e., five illustrated in FIG. 1) adapted to be carried by a respective occupant of at least one occupant 56 (i.e., five illustrated in FIG. 1). In one embodiment, the mobile device 54 is capable of interfacing with the occupant 56 to determine the occupant's present comfort level, receiving current biometric information about the occupant, and conduct bi-direction communication with the electronic device 38 to optimize occupant comfort levels. The mobile device 54 may be a wearable mobile device. Non-limiting examples of a wearable mobile device include a smart watch, a smart shoe, and smart glasses.

To support operation of the biometric air conditioning control system 20, the electronic device 38 may include a transceiver 58 that includes an antenna, and a short-range wireless device 60 configured to generate a beacon signal (see arrow 62 in FIG. 2) that may be broadcasted via the transceiver 58 for detection by the mobile device 54. In one embodiment, the beacon signal 62 is a Bluetooth signal. The mobile device 54 may be configured to confirm the location of the mobile device 54 in one of the plurality of areas 26A, 26B, 26C via the detection of the respective beacon signal 62. In addition, too, or in another embodiment, authentication between the mobile device 54 and the respective electronic device 38 may be achieved via the beacon signal detection, where the beacon signal 62 includes an authentication code recognized by the mobile device 54. It is further contemplated and understood that other means of locating the mobile device 54 may include satellite-based geographic locating devices including Geographic Positioning Systems (GPS). In another embodiment, the transceiver 58 may be generally reduced to a receiver in applications where the electronic device 38 does not need to send communications to the mobile device 54 (i.e., bi-directional communication is not needed).

The mobile device 54 may include a transmitter 64 that may be a transceiver, a controller 66, a detection system 68, biometrics sensing assembly 69, a Human Interface Device (HID) 70, and a microphone 72 that may be part of the HID 70. The controller 66 may include a processor 74 and an electronic storage medium 76. The processor 74 may be any combination of one or more of a central processing unit (CPU), multiprocessor, microcontroller unit (MCU), digital signal process (DSP), application specific integrated circuit, and others capable of executing software instructions, or otherwise controllable to behave according to predetermined logic. The storage medium 76 is, optionally, any combination of read and write memory (RAM) and read only memory (ROM). The storage medium 76 may also include persistent storage, which can be any single one or combination of solid-state memory, magnetic memory, or optical memory storing a computer program (i.e., application) with software instructions.

The detection system 68 of the mobile device 54 may include an inertial measurement unit (IMU) sensing system 78, and an environment detecting system 80. The IMU sensing system 78 is adapted to at least detect and measure motion the mobile device 54 and output motion information (see arrow 82 in FIG. 2) to the controller 66. To generate the motion information 82, the IMU sensing system 78 may include any one, or combination, of an accelerometer 84, a gyroscope 86, a magnetometer 88, a visual camera 92 (i.e., computer-vision system), a proximity sensor 98, and others adapted to detect acceleration, and thus movement, in at least one dimension, and optionally three dimensions. The motion information may be used for the detection of an intentional gesture performed by the occupant 56 wearing the respective mobile device 54.

In one embodiment, the environment detecting system 80 is configured to detect, measure, and output environment information (see arrow 90 in FIG. 2) to the controller 66 that may be used to determine or further confirm a location of the mobile device 54. In one embodiment, the intentional gesture may be deciphered by the controller 66 from the motion information 82 and reconfirmed to optimize confidence levels by the controller via analyzing the environment information 90. The environment detecting system 80 of the detection system 68 may include one or more of a temperature sensor 94, a light sensor 96, a humidity sensor 97, and a carbon dioxide sensor 99.

The biometrics sensing assembly 69 of the mobile device 54 is adapted to detect and measure biometrics information (see arrow 100 in FIG. 2) of the occupant 56 that wears the mobile device 54 and sends the biometrics information 100 to the mobile device 54. Examples of biometrics may include skin temperature, body temperature, metabolism or heartrate, respiratory traits, and other traits that may be used to determine a comfort level of the occupant. As such, the biometrics sensing assembly 69 may include a temperature sensor 102 adapted to measure skin temperature of the user, and a metabolism sensor 104 adapted to measure a heart rate of the occupant.

The mobile device 54 is adapted to wirelessly communicate with the electronic device 38 over a wireless interface 106 and via the respective transceivers 64, 58. In operation of one embodiment, the controller 66 of the mobile device 54 may determine if the occupant 54 is comfortable or uncomfortable via the processing of the biometric information 100. Base on this determination, the mobile device 54 may send a command signal (see arrow 108) over interface 106 that effects appropriate control, or actuation, of the air conditioning unit 24.

The biometric air conditioning control system 20 may further include a software-based application 110, authentication data 112, preprogrammed scenario data 114, profile matrix data 116, frequented location data 117, a satellite-based location module 118 (e.g., GPS), a gesture module 120, and a comfort module 122. It is contemplated and understood that the modules 118, 120, 122 may include executable software instructions, and may be part of the application 110.

In one embodiment, the preprogrammed scenario data 114 may be indicative of a 'compound' motion made by the occupant 54 wearing the respective mobile device 54. The compound motion may, or may not, include an intentional gesture made by the occupant in any given moment in time and may further include other motions made by the occupant such a walking. It is understood that the preprogrammed scenario data 114 is dependent upon the type of mobile device. For example, the motion of the mobile device 54 created when the occupant 56 is walking will be different for a smart watch when compared to a smart shoe.

Figure 4:
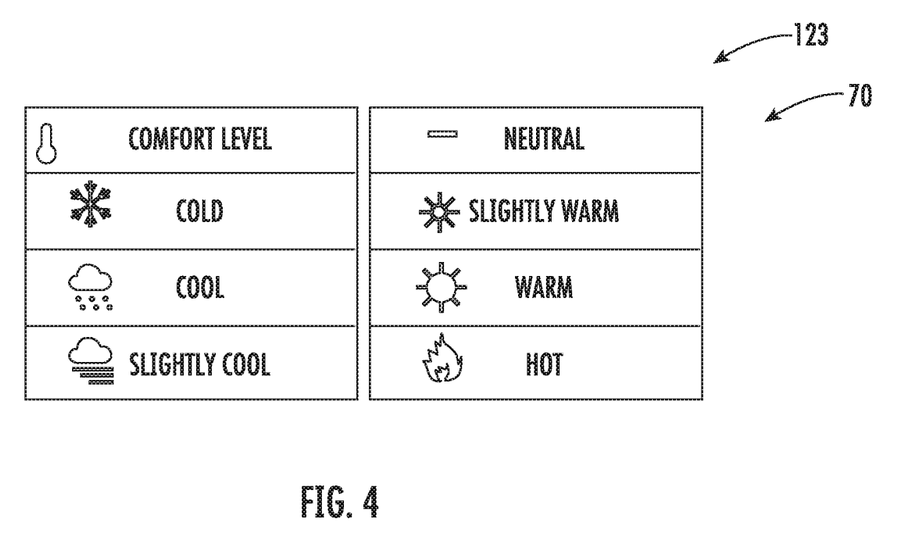
FIG. 4 is a screen shot portraying comfort information entered by the occupant and displayed on a Human Interface Device (HID) of the mobile device.

In one embodiment, the profile matrix data 116 (e.g., the thermal profile matrix data) is specific to an occupant 56 and may be a function of each frequented area of the plurality of areas 26A, 26B, 26C, the comfort perception (i.e., comfort level data) which may change with differing air flow rates used by each area 26, biometric data that may be associated with the comfort level data, and other factors. Use of the profile matrix data 116 by the application 110 reduces the need for the application 110 to communicate with, prompt, or make inquiries to, the occupant 56 via the HID 70. That is, the occupant 56 may only be prompted to select their current comfort level information (see arrow 123 in FIG. 2, and the screen shot of the HID 70 in FIG. 4) if the comfort level is not already known for a current biometric reading (i.e., the current biometric information 100).

Figure 3:
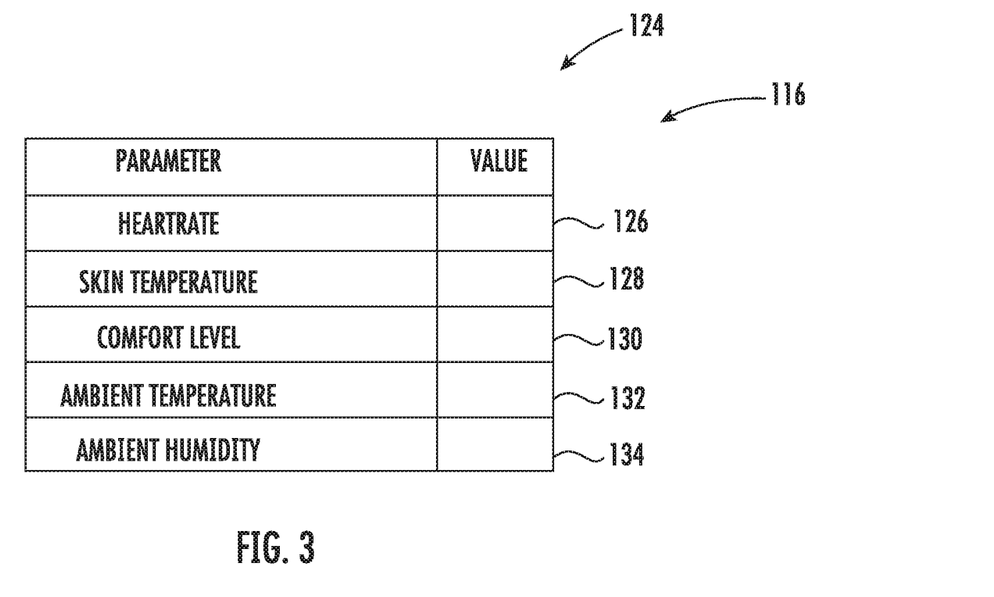
FIG. 3 is a diagram of a programmed comfort profile of an occupant wearing a mobile device of the biometric air conditioning control system.

In one embodiment, the profile matrix data 116 may generally include a thermal profile 124 specific to a particular occupant 56, and specific to a particular area of the plurality of areas 26A, 26B, 26C. The thermal profile 124 may include a plurality of parameter values including heartrate data 126, skin temperature data 128, comfort level data 130, ambient temperature data 132, and ambient temperature humidity data 134. Therefore, at a particular temperature and humidity, and with a measured heartrate and skin temperature, the comfort level may be predicted, without prompting the occupant 56.

In one embodiment, the frequented location data 117 may be applied by the application 110 to determine if, for example, the occupant 56 is a primary occupant or the occupant 56 is merely a visitor or transitory occupant. The system 20 may provide priority to a primary occupant, over a transitory occupant. For example, and in FIG. 1, three occupants 56B, 56C, 56D, all with mobile devices 54 may be in area 26B. Via the frequented location data 117 for each occupant 56B, 56C, 56D, the system 20 may give priority to occupant 56B if occupant 56B frequents area 26B more than occupants 56C, 56D.

Figure 5:
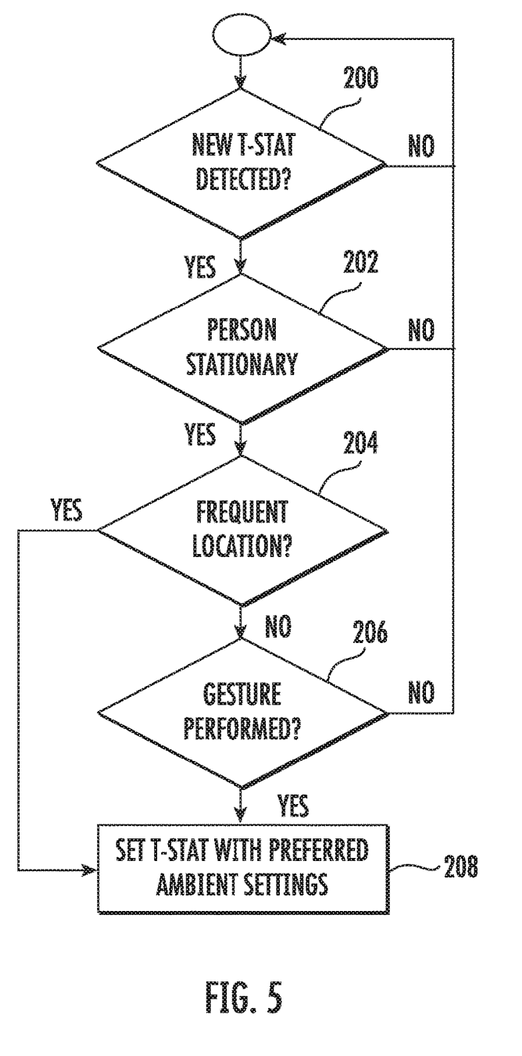
FIG. 5 is a flow chart illustrating a method of operating the biometric air conditioning control system.

Referring further to FIG. 1, an occupant 56A of the plurality of occupants 56 may be located in area 26A, occupants 56B, 56C, 56D may be located in area 26B, and occupant 56E may be located in area 26C. Referring to FIG. 5, a method of operating the biometric air conditioning control system 20 is illustrated, wherein at block 200, the mobile device 54 worn by occupant 56A may detect the presence of the electronic device 38 in area 26A via the detection of the specific beacon signal 62. That is, each beacon signal 62 may generally include an address, or a distinguishing trait, specific to a particular area of the plurality of areas 26A, 26B, 26C. Furthermore, the application 110 may generally compare the beacon signal 62 to the authentication data 112 to authenticate the mobile device 54 for use with the electronic device 38 in, for example, area 26A.

At block 202, the application 110 may determine if the occupant 56A is standing still or is stationary. This may be accomplished by analyzing the motion information 82 received from the IMU sensing system 78 and comparing the information 82 to the preprogrammed scenario data 114.

In one embodiment, if the occupant 56A is not standing still, the system 20 continues to monitor for an electronic device 38.

If, or when, the occupant 56A is determined to be standing still, and at block 204, the application 110 may analyze the frequented location data 117 to determine if the particular occupant 56A has substantially frequented the area 26A in the past. If yes, the mobile device 54 worn by the occupant 56A is granted access to command the electronic device 38.

If the occupant 56A has not frequented area 26A appreciably in the past, the application 110 may deem the occupant 56A to be a visitor, or a transitory occupant as opposed to a primary occupant. If this is the case, and at block 206, the application 110, and via the gesture module 120, may provide the visiting occupant 56 an opportunity to perform an intentional gesture (to be further explained below). At block 208, and if the visiting occupant 56 performs the intentional gesture, and the gesture is detected/measured by the detection system 68 and recognized by the gesture module 120, the visiting occupant 56A may be granted access to command the electronic device 38 as a visitor.

Figure 6:
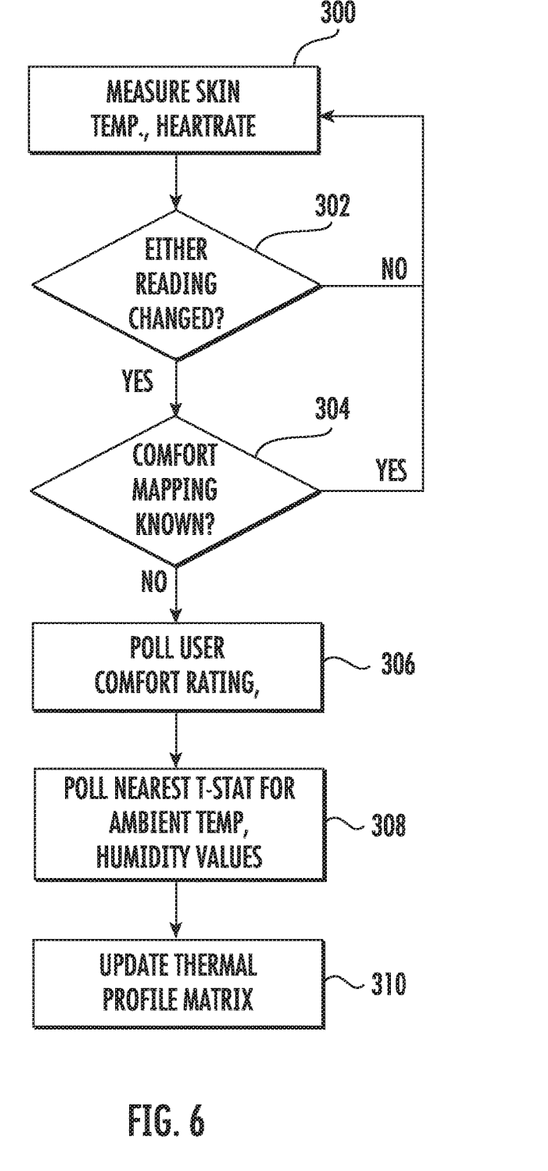
FIG. 6 is a flow chart illustrating a method of operating the biometric air conditioning control system with comfort level information inputted via the mobile device and by the occupant.

Referring to FIG. 6, at block 300, and once the occupant 56A is granted access to the electronic device 38, the biometric sensor assembly 69 sends biometric information 100 to the controller 66. At block 302, comfort module 122 of the application 110 may analyze the biometric information 100 for any changes in readings (e.g., skin temperature and heartrate). If no changes, the analysis continues (i.e., back to block 300).

At block 304, and if changes in the biometric information 100 does occur, the comfort module 122 analyzes the profile matrix data 116 to determine if a comfort profile 124 (i.e., thermal profile) is known. If yes, the method returns to block 300. At block 306, and if a comfort profile 124 is not known, the mobile device 54 may prompt the occupant 56A for a comfort rating (see FIG. 4). At block 308, the comfort module 122 may then poll the nearest electronic device 38 for air parameter information (e.g., temperature and humidity information 44A, 44B) measured by the air parameter sensor assembly 42. At block 310, the comfort profile 124 and thus the profile matrix data 116 may be updated by the comfort module 122 to reduce the need for future prompts and thus disturbances placed upon the occupant 56A.

Referring further to FIG. 2, detection and measurement of the motion information 82 (i.e., the compound motion) of the mobile device 54 is needed to recognize an intentional gesture made by the occupant 56 through differentiation of one or more motions made by the occupant simultaneously. The determination of the position and/or location of the mobile device 54 relative to the occupant 56 may assist in the differentiation of multiple motions made by the occupant 56 from the measured compound motion of the mobile device 54.

In one embodiment, the visual camera 92 is adapted to detect movement via the capturing of images of surroundings and analyzing differences in the images over time. The temperature sensor 92 may be the same temperature sensor as 102 (i.e., dual function), and is adapted to measure temperature. In one embodiment, temperature data is indicative of, at least in-part, the body temperature of the user 23.

In operation, the IMU sensing system 78 enables the identification of gesture-based intent, and the environment detecting system 80 functions to boost the reliability of the intentional gesture identification. In one example, this is achieved by the fusion of information gained from the systems 78, 80 by the application 110 and use of machine learning algorithm(s) and/or the preprogrammed scenario data 114.

In another embodiment, the comfort profile 124 may be derived from a health profile. That is, occupants 56 with wearable devices may share their profiles and statistics like age, gender, BMI, and others, for benefitting other occupants who do not have mobile devices 54 with the biometric sensor assembly 69. The system 20 may apply differential privacy to ensure privacy of mobile device users.

In another embodiment, at least a portion of the application 110 and data 112, 114, 116, 117 may be executed and stored in a cloud-based server with bi-directional communication between the mobile device 54 and the cloud-based server, and/or bi-directional communication between the electronic device 38 and the cloud-based server. Regardless of where the data 112, 114, 116, 117 resides, security measures may be implemented to keep the data private and/or accessible only to the associated occupant 56.

Advantages and benefits of the present disclosure include personalized comfort for wearable, mobile device, users, and the elimination of friction in specifying comfort. Yet further, the system 20 allows the use of personal setting at visiting locations or areas, and may allow users, without wearable devices that have the biometric sensor assembly 69, to obtain thermal profiles based on a health profile.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A biometric air conditioning control system adapted to control an air conditioning unit, the biometric air conditioning control system comprising:
   a local electronic device located in a predefined area, and including a transceiver and a short-range communication device configured to broadcast a beacon signal via the transceiver;
   an ambient air parameter sensor configured to measure and output at least one measured air parameter information;
   a mobile device adapted to be carried by an occupant, the mobile device including a human interface device (HID), a transceiver configured to receive the beacon signal, a biometrics sensor configured to measure and output at least one measured biometric information of the occupant relative to occupant comfort;
   one or more electronic storage mediums of the mobile device configured to store profile matrix data, authentication data associated with the beacon signal, and a software-based application; and
   one or more processors of the mobile device configured to execute the software-based application that compares the authentication data to the beacon signal, and compares the profile matrix data to an occupant comfort level information inputted by the occupant via the HID, the at least one measured biometric information, and the at least one measured air parameter information, wherein the one or more processors are configured to output a command signal to the local electronic device to effect control of the local electronic device for optimizing occupant comfort, and wherein the command signal is generated from the comparison of the profile matrix data to the occupant comfort level information, the at least one measured biometric information, and the at least one measured air parameter information.

2. The biometric air conditioning control system set forth in claim 1, wherein the local electronic device is a thermostat that includes the ambient air parameter sensor, and the at least one measured air parameter information is wirelessly sent to the mobile device via the transceiver of the local electronic device.

3. The biometric air conditioning control system set forth in claim 2, wherein the ambient air parameter sensor includes a temperature sensor.

4. The biometric air conditioning control system set forth in claim 3, wherein the ambient air parameter sensor includes a humidity sensor.

5. The biometric air conditioning control system set forth in claim 1, wherein the profile matrix data includes learned data associating parameter data to biometrics data.

6. The biometric air conditioning control system set forth in claim 5, wherein the profile matrix data includes occupant comfort level data associated with the biometrics data.

7. The biometric air conditioning control system set forth in claim 1, wherein the mobile device includes the one or more electronic storage mediums and the one or more processors.

8. The biometric air conditioning control system set forth in claim 1, wherein the software-based application is configured to develop and store occupant visiting history data.

9. The biometric air conditioning control system set forth in claim 1, wherein the mobile device includes an inertial measurement unit (IMU) sensing system, and the one or more storage mediums are configured to store gesture-based data indicative of an intentional gesture performed by the occupant signifying an intent for the application to process the profile matrix data specific to the occupant.

10. The biometric air conditioning control system set forth in claim 9, wherein the profile matrix data is one of a plurality of profile matrix data with each profile matrix data being specific to one of a plurality of mobile devices with each one of the plurality of mobile devices being adapted to be worn by a respective one of a plurality of occupants, and wherein the mobile device sets the thermostat only when measured biometric data indicates that a current comfort level of the occupant is outside of a desired comfort level specified in the profile matrix data for the occupant.

11. The biometric air conditioning control system set forth in claim 10, wherein the IMU sensing system is configured to measure occupant motion indicative of the intentional gesture and whether or not the occupant is stationary within the predefined area.

12. A biometric air conditioning control system adapted to control an air conditioning unit for separately adjusting air temperature in a plurality of predefined areas, the biometric air conditioning control system comprising:
   a plurality of thermostats with each thermostat of the plurality of thermostats located in a respective one of the plurality of predefined areas, each thermostat including a controller, a transceiver, and an ambient air temperature sensor configured to measure and output ambient air temperature information; and a mobile device adapted to be carried by an occupant, the mobile device including an electronic storage medium, a processor, a human interface device (HID), a transceiver configured to receive the beacon signal and the ambient air temperature information, an occupant temperature sensor configured to measure and output a skin temperature of the occupant associated with occupant comfort, wherein the electronic storage medium is configured to store thermal profile matrix data associated with occupant comfort, and a software-based application, and the processor is configured to execute the software-based application configured to compare the profile matrix data to an occupant comfort level information inputted by the occupant via the HID, the occupant temperature information, and the ambient air temperature information, then effect the output of a command signal based on the comparison to the controller of the respective thermostat of the plurality of thermostats to optimize occupant comfort.

13. The biometric air conditioning control system set forth in claim 12, wherein each thermostat of the plurality of thermostats include a near field communication device configured to broadcast a beacon signal via the transceiver of the respective thermostat, the electronic storage medium is configured to store authentication data associated with the beacon signal, and the software-based application is configured to compare the authentication data to the beacon signal to authenticate the respective occupant.

14. The biometric air conditioning control system set forth in claim 12, wherein the mobile device includes an inertial measurement unit (IMU) sensing system configured to measure and output mobile device motion data, and the software-based application is configured to process the mobile device motion data to determine if the respective occupant a transitory occupant or a primary occupant of the plurality of occupants.

15. The biometric air conditioning control system set forth in claim 14, wherein the software-based application is configured not to effect the output of the command signal if the occupant is a transitory occupant and effect the output of the command signal if the occupant is a primary occupant.

16. The biometric air conditioning control system set forth in claim 12, wherein the mobile device is a wearable mobile device.

17. The biometric air conditioning control system set forth in claim 15, wherein the mobile device is one of a smart watch, a smart shoe, and smart glasses.

18. A method of operating a biometric air conditioning control system comprising:
 detecting a thermostat by a mobile device carried by an occupant
 determining if the occupant is stationary by the mobile device;
 determining if the occupant is a primary occupant by the mobile device if the occupant is determined to be stationary;
 detecting an intentional gesture performed by the occupant if the occupant is determined not to be a primary occupant;
 sending a command signal to the thermostat indicative of a preferred ambient temperature if the intentional gesture is received and recognized by the mobile device; and
 learning a profile matrix data specific to the occupant by a software-based application executed by a processor of the mobile device, wherein the learning includes:
 measuring a skin temperature and heartrate of the occupant by respective temperature and metabolism sensors of the mobile device;
 determining if the skin temperature and heartrate reflect a change;
 determining if a profile matrix data is preprogrammed into the mobile device if the skin temperature or the heartrate has changed; and
 polling the occupant for a comfort rating if the profile matrix data is not preprogrammed.

\* \* \* \* \*